United States Patent Office 3,006,877
Patented Oct. 31, 1961

3,006,877
RESIN SOLUTIONS SUITABLE FOR PRODUCING COATINGS
Marcel Herzberg, Paris, France, assignor to Ciba Limited, Basel, Switzerland, a Swiss firm
No Drawing. Filed June 2, 1959, Ser. No. 817,461
Claims priority, application France June 11, 1958
13 Claims. (Cl. 260—24)

This invention provides resin solutions suitable for the production of lacquer coatings or protective coatings having a good elasticity and adhesion and also an excellent resistance to mechanical and thermal stress and chemical agents. These solutions comprise (A) an epoxy-resin, (B) coal tar pitch having a softening point of at least 60° C. (measured by the ring-and-ball method and/or bitumen having a softening point of at least 45° C. (as measured by the ring-and-ball method), (C) a hardening agent for epoxy-resins, (D) as a solvent or solution promoter a chlorinated hydrocarbon and/or a ketone, and, if desired, (E) a solvent different from (D), for example, an alicyclic or aromatic hydrocarbon.

As epoxy-resins (A) there are to be understood epoxide compounds which contain $n$ epoxide groups calculated on the average molecular weight, where $n$ is a whole number or fractional number greater than 1, that is to say, compounds having an epoxide equivalency greater than 1.

As epoxide compounds of the kind defined there may be mentioned, for example, epoxidated diolefines, dienes or cyclic dienes, such as butadiene oxide, 1:2:5:6-diepoxy-hexane and 1:2:4:5-diepoxy-cyclohexane; epoxidated di-olefinically unsaturated carboxylic acid esters, such as methyl 9:10:12:13-diepoxy-stearate or the dimethyl ester of 6:7:10:11-diepoxy-hexadecane-1:16-dicarboxylic acid; epoxidated compounds containing two cyclohexenyl radicals, such as diethylene glycol-bis-(3:4-epoxy-cyclohexane carboxylate) and 3:4 epoxy-cyclohexylmethyl-3:4-epoxy-cyclohexane carboxylate. There may also be mentioned basic polyepoxide compounds such as are obtained by the action of a primary or secondary aromatic diamine, such as aniline or 4:4'-di-[monomethylamino]-diphenyl-methane, with epichlorhydrin in the presence of an alkali.

There may also be mentioned polyglycidyl esters such as are obtained by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid and especially from aromatic dicarboxylic acids such as phthalic acid, isophthalic acid, terephthalic acid, 2:6-naphthylene dicarboxylic acid, diphenyl-ortho:ortho'-dicarboxylic acid, ethylene glycol-bis-(para-carboxy-phenyl)-ether and the like. There may be mentioned, for example, diglycidyl adipate and diglycidyl phthalate and also diglycidyl esters which correspond to the average formula (I)
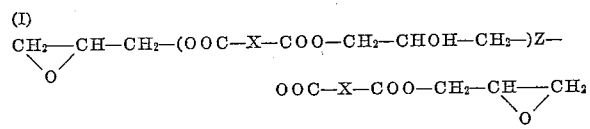
OOC—X—COO—CH₂—CH—CH₂
(at end, with epoxy ring)

in which X represents an aromatic hydrocarbon radical, such as a phenyl radical, and Z represents a whole or fractional small number.

There may also be mentioned polyglycidyl ethers such as are obtainable by the etherification of a polyhydric alcohol or polyphenol with epichlorhydrin or dichlorhydrin in the presence of an alkali. These compounds may be derived from glycols, such as ethylene glycol, diethylene glycol, triethylene glycol, propylene glycol-1:2, propylene-glycol-1:3, butylene-glycol-1:4, pentane-diol-1:5, hexane-diol-1:6, hexane-triol-2:4:6, glycerine and especially from polyphenols, such as phenol novolacs or cresol novolacs, resorcinol, pyrocatechol, hydroquinone, 1:4 dioxynaph-thalene, bis-[4-hydroxyphenyl]-methane, bis-[4-hydroxy-phenyl]-methyl-phenyl methane, bis-[4-hydroxyphenyl]-tolyl-methane, 4:4'-dioxydiphenyl, bis-[4-hydroxyphenyl]-sulfone and especially 2:2-bis-[4-hydroxyphenyl]-propane. There may be mentioned ethylene glycol diglycidyl ethers and resorcinol diglycidyl ethers, and also diglycidyl ethers which corresponds to the average formula.

(II)
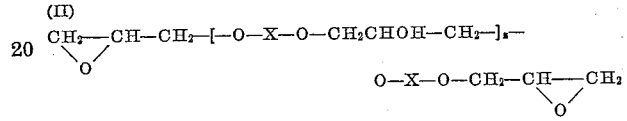
O—X—O—CH₂—CH—CH₂
(epoxy end)

in which X represents an aromatic radical, and Z represents a whole or fractional small number.

There are also suitable epoxy-resins that are solid or liquid at room temperature, for example, those derived from 4:4'-dioxy-diphenyl-dimethylmethane, which have an epoxide content of about 0.5 to 5.5 epoxide equivalents per kilogram. Such epoxy-resins correspond, for example, to the average formula

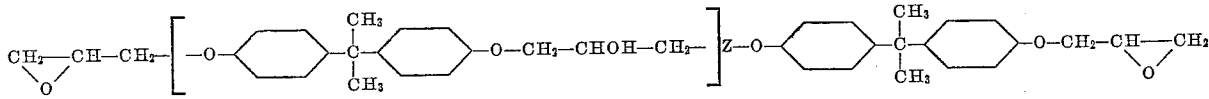

in which Z represents a whole or fractional small number.

There may also be used epoxy resins which are esterified with carboxylic acids and still contain free epoxy groups. As esterifying acids there may be mentioned higher fatty acids, especially unsaturated fatty acids from drying oils, and also resin acids and polycarboxylic acids such as sebacic acid, phthalic acid, citric acid, or the like.

As coal tar pitches (B) there are used the solid radicals obtained by the distillation of coal tars and which have a softening point of at least 60° C., and advantageously at least 80° C. (measured by the ring-and-ball method). The coal tar pitch is advantageously free from moisture before use, for example, by being melted. Instead of the coal tar pitches, which are preferably used, there may be used bitumen having a softening point of at least 45° C. (measured by the ring-and-ball method).

As "bitumen" there are to be understood distillation bitumen obtained by the distillation of crude oil ("radical asphalt") and also extract bitumen and cracking bitumen, and finally the blown bitumen ("blast bitumen") obtained by the oxidation with air at a high temperature of soft distillation, extraction or cracking radicals.

There may also be used mixtures of coal tar pitches and bitumen, the proportion of one component advantageously not exceeding 5–10% of the other component.

The relative proportions of epoxy-resin to coal tar pitch or bitumen are advantageously chosen within certain limits. In general, these limits depend little upon the nature of the epoxy-resin but they do vary with the nature of the pitch or bitumen used.

In general there are advantageously used for every 100 parts by weight of epoxy resin;
5–900 parts by weight of coal tar pitch,
5–800 parts by weight of distillation bitumen, 5–780 parts by weight of blown bitumen.

There are advantageously used for every 100 parts by weight of epoxy resin:

15–600 parts by weight of coal tar pitch,
50–200 parts by weight of distillation bitumen,
50–200 parts by weight of blown bitumen.

As hardening agents (C) there may be used the usual hardeners for epoxide-compounds, advantageously amines or amides. There may be mentioned aliphatic and aromatic primary, secondary or tertiary amines, for example, mono-, di- and tri-butylamine, para-phenylene diamine, ethylene diamine, N:N-diethyl-ethylene diamine, diethylene triamine, triethylene tetramine, tetraethylene pentamine, trimethylamine, diethylamine, triethanolamine, Mannisch bases, piperidine, piperazine, guanidine and guanidine derivatives, such as phenyl-diguanidine, di-phenyl-guanidine, dicyandiamide, aniline-formaldehyde resins, urea-formaldehyde resins, melamine-formaldehyde resins, polymers of aminostyrenes, polyamides, for example, those derived from aliphatic polyamines and di-merized or trimerized unsaturated fatty acids.

However, there may also be used other usual hardeners for epoxy-resins, such as isocyanates, isothiocyanates, polyhydric phenols, for example, resorcinol, hydroquinone, quinone, phenol-formaldehyde resins, oil-modified phenol-formaldehyde resins, reaction products of aluminum alcoholates or phenolates with tautomeric compounds of the type of acetoacetic acid ester, Friedel-Crafts' catalysts, for example, aluminum chloride, antimony pentachloride, stannic chloride, ferric chloride, zinc chloride, boron trifluoride or complexes of boron trifluoride with organic compounds; phosphoric acid; polybasic carboxylic acids and anhydrides thereof, for example, phthalic anhydride, ethyl-endomethylene-tetra-hydrophthalic anhydride or endomethylene-tetrahydro-phthalic anhydride or mixtures thereof; maleic or succinic anhydride, and, if desired, accelerators such as tertiary amines may be added. The word "harden" is used herein to denote the conversion of the soluble and fusible epoxide resin (A) into an insoluble and infusible resin.

The solvent or solution promoter (D) must be compatible with the epoxy-resin and also with the bitumen. There are advantageously used ketones or chlorinated hydrocarbons or advantageously mixtures thereof.

Among ketones there are preferably used methyl isobutyl ketone, methyl ethyl ketone or cyclohexanone.

Among chlorinated hydrocarbons there may be mentioned those of the aliphatic series, such as trichlorethylene or perchlorethylene, and especially those of the aromatic series, advantageously ortho-, meta- or para-di-chlorobenzene.

When coal tar pitch is used it is not usual to add another solvent. On the other hand, when a bitumen is used a part of the ketone and/or chlorinated hydrocarbon may be replaced by a suitable solvent or diluent such as a cycloaliphatic or aromatic hydrocarbon, for example, toluene, xylene or anthracene heavy oil, or a solution promoter such as colophony. The resin solutions may also contain an extender, filler or gelatinising agent, plasticiser, coloring matter or the like. As extenders or fillers there may be used, for example, kaolin, bentonite, metal powders or especially finely divided silicic acid ("Aerosil"). In this manner viscous or thixotropic or paste-like coating compositions can be obtained.

The resin solutions can in certain cases be made by simply melting together the components. In the case of cold hardening resin solutions the hardener, if desired, in the form of a solvent in a solvent (D), is naturally added shortly before use of the resin solution.

In general, however, it is of advantage to prepare two separate solutions, of which one contains the epoxy-resin dissolved in a solvent (D), and the other contains coal tar pitch or bitumen, if desired, together with a hardening agent, in a solvent (D). The two solutions are mixed together shortly before use. The hardener or a solution thereof, may, of course, be separately prepared, and added at the same time as or after the solution of the epoxy-resin is mixed the solution of the coal tar pitch or bitumen.

The resin solutions of this invention are used with advantage for all purposes in the lacquer field in which lacquer coatings or protective coatings having especially good mechanical strength, resistance to the weather and resistance against corrosive chemical influences are desired. In order to ensure good adhesion of the lacquer coatings produced with the resin solutions the substratum should be thoroughly defatted in the usual manner before the lacquer is applied. On the other hand, it is surprisingly not essential, especially in the case of lacquers containing coal tar pitch, to remove solid impurities or surface layers completely from the substrata to be treated, such as dust radicals or metal oxide layers (for example, hammer scale, rust etc.), in order to obtain lacquer films having optimum properties.

The following examples illustrate the invention, the parts and percentages being by weight:

*Example 1*

The following single component lacquers A, B, C and D that harden well under the action of heat are prepared by melting together the starting materials given in the following table:

| | Parts by weight | | | |
|---|---|---|---|---|
| | A | B | C | D |
| Epoxy-resin obtained by condensing epichlorhydrin with bis-[4-hydroxyphenyl]-dimethyl-methane in the presence of an alkali, and having a softening point of 125–132° C. (by the method of Durran) and an epoxide content of 0.49–0.60 epoxide equivalent per kilograms | 18 | 21 | 22 | 20 |
| Coal tar pitch, softening point 90° C. (ring-and-ball method) | 25 | 0 | 0 | 1 |
| Distillation bitumen, softening point 85° C. (ring-and-ball method) | 0 | 10 | 0 | 1 |
| Blown bitumen, softening point 87° C. (ring-and-ball method) | 0 | 0 | 9 | 8 |
| Ortho-dichlorobenzene | 0 | 14 | 14 | 14 |
| Methyl isobutyl ketone | 0 | 30 | 30 | 30 |
| Toluene | 30 | 0 | 0 | 0 |
| Diacetone alcohol | 14.5 | 0 | 0 | 0 |
| Methyl ethyl ketone | 0 | 8 | 8 | 9 |
| Urea-formaldehyde resin (hardener) | 12.5 | 15 | 15 | 15 |

The above single component lacquers can be stored for several months.

*Example 2*

A two-component lacquer had the following composition:

Component A:                                          Parts by weight
  Epoxy-resin obtained by condensing epichlorhydrin with bis-[4-hydroxyphenyl]-dimethylmethane in the presence of an alkali, and having a softening point of 64–76° C. and an epoxide content of 1.9–2.2 epoxide equivalent per kilogram _____ 20
  Coal tar pitch, softening point 87–94° C. (ring-and-ball method) _____ 20
  Ortho-dichlorobenzene _____ 60

Component B (hardener solution):
  Diethylene triamine _____ 50
  Cyclohexanone _____ 50

Before use 100 parts of component A were mixed with 2.5 parts of component B. The pot-life of the lacquer ready for use was about 24 hours.

After being applied to surfaces, such as the surfaces of metal plates, the lacquer hardened out at room temperature to give very hard coatings (pendulum hardness according to Persoz about 385).

Lacquer solutions having similar properties are obtained by using, instead of 20 parts of coal tar pitch, 18 parts of distillation bitumen (softening point 85° C.) or 17 parts of blown bitumen (softening point 87° C.).

Example 3

A three-component lacquer had the following composition:

Component A: Parts by weight
    Epoxy-resin as used in Example 2_____ 20
    Ortho-dichlorobenzene_____ 20

Component B:
    Coal tar pitch, softening point 90° C. (ring-and-ball method)_____ 20
    Ortho-dichlorobenzene _____ 20

Component C:
    Diethylene triamine_____ 20
    Cyclohexanone_____ 20

Before use 50 parts of component A were mixed with 50 parts of component B and 2.5 parts of component C.

Example 4

100 parts of distillation bitumen D2 (Shell) were melted, and 100 parts of an epoxy-resin liquid at room temperature, obtained by the condensation of epichlorhydrin with bis-[4-hydroxyphenyl]-dimethylmethane in the presence of an alkali, and having a viscosity of 10,000–16,000 centipoises at 25° C. and an epoxide content of 4.8 to 5.7 epoxide equivalents per kilogram. The mixture was heated for a short time at 200° C., whereupon the mixture became homogeneous. At 195° C. there were then added 100 parts of anthracene heavy oil (Societe Huiles, Goudrons et Derives) and 200 parts of cyclohexanone, were added, and 200–300 parts of ortho-dichlorobenzene were finally added at about 55° C. There was obtained a resin solution that was clear at room temperature.

For preparing a cold-hardening lacquer ready for use there were added to 100 parts of the above resin solution 2.5 parts of a hardener solution, which contained equal parts of diethylene triamine and cyclohexanone.

By using a mixture of 183 parts of distillation bitumen D2 and 108 parts of the above-mentioned epoxy-resin, and adding thereto at 195° C. 108 parts of anthracene heavy oil and 200 parts of cyclohexanone, and then adding 200 parts of ortho-dichlorobenzene at 55° C., there was likewise obtained a resin solution that was clear at room temperature.

Example 5

45 parts of distillation bitumen C5 (Shell) were melted at 200° C. 50 parts of the epoxy-resin described in Example 2 were added, after being heated to 130° C., and a homogeneous mixture was obtained. There were then added in succession 40 parts of anthracene heavy oil, 50 parts of cyclohexanone and 50 parts of orthodichlorobenzene. There was obtained a resin solution that was clear at room temperature.

In order to prepare a cold-hardening lacquer ready for use 1 part of the above resin solution was mixed with 3 parts of a resin solution having the following composition:

Parts by weight
Solution of 2.5% strength of ethylene diamine in
    cyclohexanone _____ 11
Methyl isobutyl ketone_____ 25
Orthodichlorobenzene _____ 49
Cyclohexanone _____ 65

Example 6

50 parts of distillation bitumen C5 (Shell) were melted at 200° C. and mixed with 20 parts of the epoxy-resin used in Example 2, which had been heated to 130° C. There were then added 45 parts of cyclohexanone and 135 parts of ortho-dichlorobenzene, and there was obtained a resin solution that was clear at room temperature.

Before using the solution as a lacquer, there were added to 100 parts of the solution 2.5 parts of a hardener solution consisting of equal parts of diethylene triamine and cyclohexanone.

Example 7

47.5 parts of distillation bitumen C5 (Shell), 47.5 parts of distillation bitumen D2 (Shell), 195 parts of colophony and 310 parts of ortho-dichlorobenzene were melted together at about 200° C. 70 parts of the resulting bitumen solution were mixed with 30 parts of the epoxy-resin mentioned in Example 4. There was obtained a resin solution (A) that was clear at room temperature. By the addition of a few parts by volume of ortho-dichlorobenzene the viscosity of the solution can be adjusted without causing turbidity.

By mixing 100 parts of the aforesaid bitumen solution with 30 parts of a mixture obtained by melting together 50 parts of the epoxy-resin mentioned in Example 4, 50 parts of colophony and 30 parts of cyclohexanone there was likewise obtained a resin solution (B) that was clear at room temperature.

By adding to 100 parts of resin solution (A) or 100 parts of resin solution (B) 2 parts of a hardener solution consisting of equal parts of diethylene triamine and cyclohexanone there is obtained a catalyzed coating solution, which is especially suitable for the production of intermediate layers of adhesively united materials, linings etc.

Example 8

40 parts of a solution of 25 parts of distillation bitumen (softening point 85° C. as measured by the ring-and-ball method) in a mixture of 43 parts of ortho-dichlorobenzene and 32 parts of methyl isobutyl ketone are mixed with 60 parts of a solution of 36.5 parts of "Epikote 1001" and 25 parts of urea-formaldehyde resin (as hardener) in a mixture of 25 parts of methyl isobutyl ketone and 13.5 parts of methyl ethyl ketone. There is obtained a one-component bakeable lacquer which is stable at room temperature and can be kept for several months.

Example 9

A paste-like coating composition was obtained by melting together the following ingredients:

Parts by weight
An epoxy-resin obtained by condensing epichlorhydrin- with bis-(4-hydroxyphenyl)-dimethyl methane in the presence of an alkali, and which was highly viscose at room temperature (25° C.) and had an epoxide content of 3.5 to 4.4 epoxide equivalents per kilogram_____ 21.5
Coal tar pitch (softening point 90° C. as measured by the ring-and-ball method_____ 10
Ortho-dichlorobenzene _____ 30
Anthracene heavy oil_____ 5
Bentonite _____ 1.5
Finely divided silicic acid ("Aerosil")_____ 32

Before use 100 parts of the above paste was stirred well with 2.5 parts of a hardener solution consisting of equal parts of diethylene triamine and cyclohexanone.

The catalyzed composition so obtained had thixotropic properties. It can be used for producing enamel-like coatings, for example, 0.2 to 2.5 millimeters thick, on supports, such as metals, cement or concrete, that may be vertical. The coatings so obtained are dust dry after 24 hours and completely hardened throughout after about 10 days, provided that hardening takes place at a temperature above 15° C. The coating has an excellent adhesion even at sharp metallic edges.

Example 10

A paste-like catalyzed coating composition is prepared by mixing together the following components A and B.

| | Parts by weight | |
|---|---|---|
| | A | B |
| Epoxy-resin mentioned in Example 9 | 167 | 0 |
| Coal tar pitch (softening point 90° C. by the ring-and-ball method) | 84 | 169 |
| Ortho-dichlorobenzene | 20 | 57 |
| Anthracene heavy oil | 12 | 13 |
| Finely divided silicic acid ("Aerosil") | 180 | 180 |
| Solution of 50% strength of diethylene triamine in cyclohexanone | 0 | 40 |

Components A and B are mixed together shortly before use. In order to increase the speed of hardening and to facilitate mixing, each of the components A and B may be separately heated, for example, to 80° C., before being mixed together.

The catalyzed coating composition so obtained has properties similar to those of the coating composition described in Example 9.

What is claimed is:

1. Resin solutions suitable for producing coatings, which solutions comprise (A) an 1,2-epoxy-resin, (B) a member selected from the group consisting of coal tar pitch having a softening point of at least 60° C. (measured by the ring-and-ball method) and bitumen having a softening point of at least 45° C. (as measured by the ring-and-ball method), (C) a hardening agent for epoxy-resins, (D) as a solvent a member selected from the group consisting of methylisobutylketone, methylethylketone, cyclohexanone and o-, m- and p-dichlorobenzene.

2. Resin solutions as claimed in claim 1, which contain for every 100 parts by weight of epoxy-resin 5 to 900 parts by weight of coal tar pitch, 5 to 800 parts by weight of distillation bitumen and 5 to 780 parts by weight of blown bitumen.

3. Resin solutions as claimed in claim 1, which contain for every 100 parts by weight of epoxy-resin 15 to 600 parts by weight of coal tar pitch, 50 to 200 parts by weight of distillation bitumen and 50 to 200 parts by weight of blown bitumen.

4. Resin solutions as claimed in claim 1, which contain a dichlorobenzene as solvent (D).

5. Resin solutions as claimed in claim 1, which contain methyl isobutyl ketone as solvent (D).

6. Resin solutions as claimed in claim 1, which contain methyl ethyl ketone as solvent (D).

7. Resin solutions as claimed in claim 1, which contain cyclohexanone as solvent (D).

8. Resin solutions as claimed in claim 1, which contain as the epoxy-resin a polyglycidyl ether of a polyhydric phenol.

9. Resin solutions as claimed in claim 8, in which the epoxy-resin is a polyglycidyl ether of bis (4-hydroxyphenyl)-dimethyl methane.

10. Resin solutions as claimed in claim 1, in which the hardening agent (C) is an alkylene polyamine.

11. Resin solutions as claimed in claim 1, in which the hardening agent (C) is a urea-formaldehyde resin.

12. Resin solutions suitable for producing coatings, which solutions comprise (A) an 1,2-epoxy-resin, (B) a member selected from the group consisting of coal tar pitch having a softening point of at least 60° C. (measured by the ring-and-ball method) and bitumen having a softening point of at least 45° C. (as measured by the ring-and-ball method), (C) a hardening agent for epoxy-resins, (D) as a solvent a member selected from the group consisting of methylisobutylketone, methylethylketone, cyclohexanone and o-, m- and p-dichlorobenzene, (E) as secondary solvent a member selected from the group consisting of alicyclic hydrocarbons and aromatic hydrocarbons.

13. Resin solutions suitable for producing coatings, which solutions comprise (A) an 1,2-epoxy-resin, (B) a member selected from the group consisting of coal tar pitch having a softening point of at least 60° C. (measured by the ring-and-ball method) and bitumen having a softening point of at least 45° C. (as measured by the ring-and-ball method), (C) a hardening agent for epoxy resins, (D) as a solvent a member selected from the group consisting of methylisobutylketone, methylethylketone, cyclohexanone and o-, m- and p-dichlorobenzene, (E) colophony as solution promoter.

References Cited in the file of this patent

UNITED STATES PATENTS

| 2,409,258 | Davis et al. | Oct. 15, 1946 |
| 2,528,417 | Bradley | Oct. 31, 1950 |
| 2,765,288 | Whittier et al. | Oct. 2, 1956 |
| 2,803,609 | Schlenker | Aug. 20, 1957 |